(12) United States Patent
Choi et al.

(10) Patent No.: US 8,774,406 B2
(45) Date of Patent: Jul. 8, 2014

(54) MASKING ADDITION OPERATION DEVICE FOR PREVENTION OF SIDE CHANNEL ATTACK

(75) Inventors: Yong-Je Choi, Daejeon (KR); Doo Ho Choi, Daejeon (KR); Taesung Kim, Daejeon (KR); Kyunghee Oh, Daejeon (KR); You Sung Kang, Daejeon (KR); Ju Han Kim, Daejeon (KR); Jeong Nyeo Kim, Daejeon (KR); Hyun sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 190 days.

(21) Appl. No.: 13/333,324

(22) Filed: Dec. 21, 2011

(65) Prior Publication Data

US 2012/0163585 A1  Jun. 28, 2012

(30) Foreign Application Priority Data

Dec. 22, 2010  (KR) .......................... 10-2010-0132383

(51) Int. Cl.
| | |
|---|---|
| *H04K 1/02* | (2006.01) |
| *H04N 7/167* | (2011.01) |
| *G06F 11/00* | (2006.01) |
| *G06F 12/14* | (2006.01) |
| *G06F 12/16* | (2006.01) |
| *G08B 23/00* | (2006.01) |

(52) U.S. Cl.
USPC ........... 380/252; 380/206; 380/207; 380/209; 726/22

(58) Field of Classification Search
None
See application file for complete search history.

(56) References Cited

U.S. PATENT DOCUMENTS

| | | | |
|---|---|---|---|
| 6,252,961 B1 * | 6/2001 | Hogan | 380/37 |
| 6,973,551 B1 * | 12/2005 | Walton | 711/155 |
| 7,334,133 B2 | 2/2008 | Goubin | |
| 7,386,130 B2 * | 6/2008 | Ito et al. | 380/263 |
| 7,403,620 B2 * | 7/2008 | Liardet et al. | 380/259 |
| 7,787,620 B2 * | 8/2010 | Kocher et al. | 380/29 |
| 2004/0139136 A1 | 7/2004 | Goubin | |
| 2005/0036618 A1 * | 2/2005 | Gammel et al. | 380/255 |
| 2007/0188355 A1 * | 8/2007 | Baek | 341/51 |
| 2009/0196107 A1 * | 8/2009 | Ogasawara et al. | 365/189.05 |

FOREIGN PATENT DOCUMENTS

KR   10-2006-0068177   6/2006

* cited by examiner

*Primary Examiner* — Azizul Choudhury
(74) *Attorney, Agent, or Firm* — Staas & Halsey LLP

(57) ABSTRACT

A masking addition operation apparatus for prevention of a side channel attack, includes a random value generation unit generating a first random value for a first input, second random value for a second input, and a summation random value. The masking addition operation apparatus includes an operation part performing an operation on the first and second random values, a previous carry input, and first and second masked random values generated based on the first and second random values. The masking addition operation apparatus includes a carry generator generating a carry input using a result of the operation part; and a summation bit generator generating a summation bit using the summation random value, the first and second random values, the previous carry input and the first and second masked random values.

4 Claims, 2 Drawing Sheets

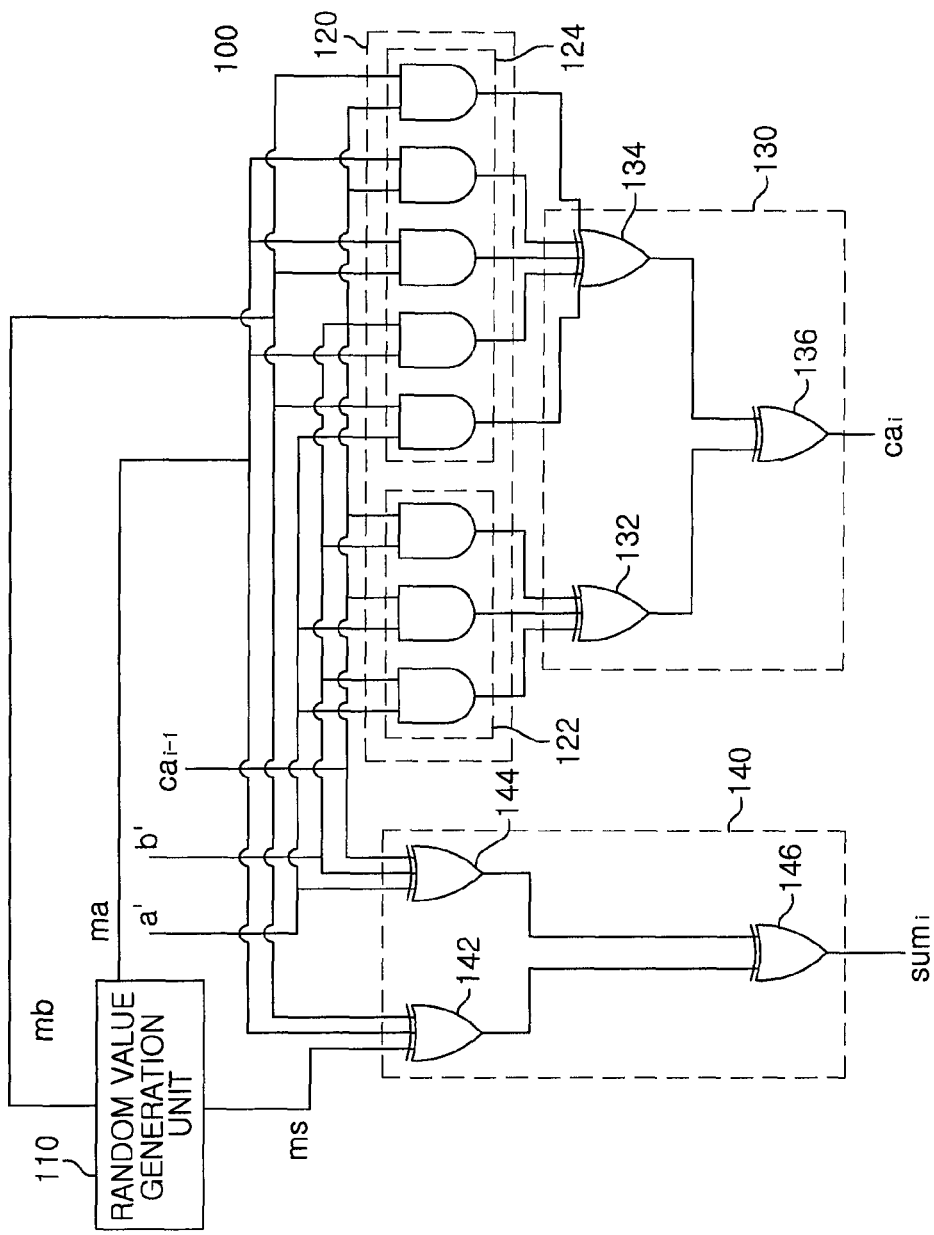

MASKING ADDITION OPERATION DEVICE FOR PREVENTION OF SIDE CHANNEL ATTACK

CROSS-REFERENCE TO RELATED APPLICATION(S)

The present invention claims priority of Korean Patent Application No. 10-2010-0132383, filed on Dec. 22, 2010, which is incorporated herein by reference.

FIELD OF THE INVENTION

The present invention relates to an addition operation device; and, more particularly, to a masking addition operation device for prevention of side channel attack.

BACKGROUND OF THE INVENTION

In order to prevent side channel attack, a method of masking random value is usually used. According to the method of masking random value, a plain text to be encrypted is masked by perform XOR operation with an arbitrary random value at the beginning of an encryption process, and after finishing the encryption process, a cipher, which is a result of the encryption process, is unmasked by perform XOR operation again with the arbitrary random value.

Meanwhile, a symmetric encryption algorithm uses an addition operation such as SEED. Such addition operation unit is constructed by combination of carry save adders, as shown in FIG. 1.

As shown in FIG. 1, conventional addition operation unit calculates a sum bit $sum_i$ by performing XOR operation between two inputs '$a_i$' and '$b_i$', and previous carry input $ca_{i-1}$, and performing AND operation between two inputs '$a_i$' and '$b_i$', and the previous carry input $ca_{i-1}$. Then, the conventional addition operation unit performs XOR operation to the result of the AND operation above, and then outputs a carry $ca_i$.

An addition operation unit of N bits can be constructed by connecting carries of the above explained addition operation unit.

However, such addition operation unit may be vulnerable to a side channel attack since the operation is performed with two inputs '$a_i$' and '$b_i$' exposed. Moreover, such addition operation unit has a difficulty in processing a masked data input in an encryption algorithm. To solve this, general addition operation units calculate a masked random valued before input not with XOR operation but with addition operation. However, when using the addition operation, it causes a lot of additional operation, increase of hardware area, and performance degradation. Moreover, it has to add XOR masking operation after performing a masking addition operation.

Due to above mentioned drawbacks, a masked value is changed due to the addition operation in the symmetric encryption algorithm using the addition operation. Accordingly, it is hard to unmask the masked value. In this algorithm, a XOR masking operation needs to be converted to a masking addition operation before the addition operation, and, after the addition operation, the converted operation needs to be re-converted. Such converting operation requires too complex algorithm that increase complexity of hardware and decreases efficiency of operation.

SUMMARY OF THE INVENTION

In view of the above, the present invention provides a masking addition operation device for prevention of side channel attack, which is capable of performing a masking process by directly applying new masking values and a summation random value without exposing two inputs which are not masked and applying the masking values itself, thereby enhancing operation efficiency.

In accordance with an embodiment of the present invention, there is provided a masking addition operation apparatus for prevention of a side channel attack, the apparatus including a random value generation unit for generating a first random value for a first input, second random value for a second input, and a summation random value ms; an operation part for respectively performing an operation on the first random value, the second random value, a previous carry input, and a first and a second masked random values which are generated based on the first and the second random values respectively; a carry generator for generating a carry input by using a result of the operation of the operation part; and a summation bit generator for generating a summation bit by using the summation random value, the first and the second random values, the previous carry input and the first and second masked random values.

In accordance with an embodiment of the present invention, masking process can be performed by directly applying the first and the second random values ma and mb and the summation random value ms without exposing the inputs 'a' and 'b' which are not masked. Therefore, additional operation and additional operation converting are not necessary, and accordingly it is possible to minimize increase of hardware volume.

BRIEF DESCRIPTION OF THE DRAWINGS

The objects and features of the present invention will become apparent from the following description of embodiments, given in conjunction with the accompanying drawings, in which:

FIG. 2 is a circuit diagram showing a masking addition operation apparatus for prevention of side channel attack, in accordance with an embodiment of the present invention.

DETAILED DESCRIPTION OF THE EMBODIMENTS

Figure 1:
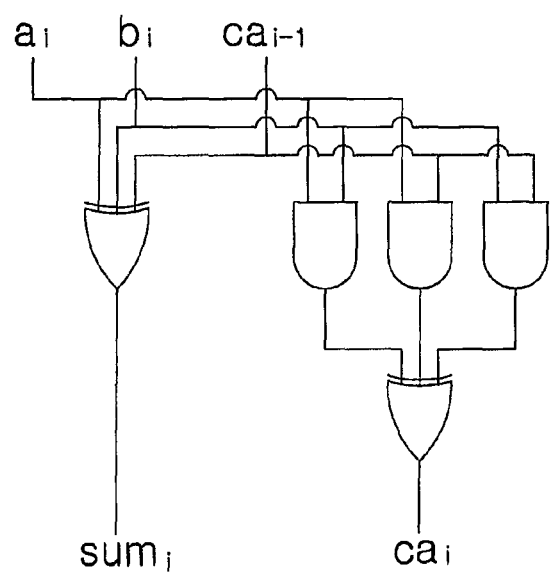
FIG. 1 is a circuit diagram showing a conventional addition operation unit.

Embodiments of the present invention will be described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Combinations of each step in respective blocks of block diagrams and a sequence diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create devices for performing functions described in the respective blocks of the block diagrams or in the respective steps of the sequence diagram.

Since the computer program instructions, in order to implement functions in specific manner, may be stored in a memory useable or readable by a computer aiming for a computer or other programmable data processing apparatus, the instruction stored in the memory useable or readable by a computer may produce manufacturing items including an instruction device for performing functions described in the respective blocks of the block diagrams and in the respective steps of the sequence diagram. Since the computer program instructions may be loaded in a computer or other programmable data processing apparatus, instructions, a series of processing steps of which is executed in a computer or other programmable data processing apparatus to create processes executed by a computer so as to operate a computer or other programmable data processing apparatus, may provide steps for executing functions described in the respective blocks of the block diagrams and the respective sequences of the sequence diagram.

Moreover, the respective blocks or the respective sequences may indicate modules, segments, or some of codes including at least one executable instruction for executing a specific logical function(s). In several alternative embodiments, is noticed that functions described in the blocks or the sequences may run out of order. For example, two successive blocks and sequences may be substantially executed simultaneously or often in reverse order according to corresponding functions.

Hereinafter, embodiments of the present invention will be described with reference to the accompanying drawings which form a part hereof.

FIG. 2 is a circuit diagram showing a masking addition operation apparatus for prevention of side channel attack, in accordance with an embodiment of the present invention and depicts a hardware structure for a symmetric encryption algorithm using addition operation unit.

As shown in FIG. 2, a masking addition operation apparatus for prevention of a side channel attack in accordance with the embodiment of the present invention, the apparatus includes a random value generation unit 110, an addition operation part 120, a carry generator 130, and a summation bit generator 140.

The random value generation unit 110 is for generation a new random value, for example a random number generator. The random value generation unit 110 generates a first random value ma for a first input, and second random value mb for a second input, and a summation random value ms, and then provides the generated random values to the addition operation part 120 and the summation bit generator 140.

The addition operation part 120 can be provided with a first masked random value a' and a second masked random value b', which are masked values of the first random value ma and the second random value mb respectively. Here, the first masked random value a' and the second masked random value b' are generated by XOR operation between the first and the second random values ma, mb and the first and the second inputs respectively.

The addition operation part 120 includes a plurality of addition operation units. The addition operation part 120 includes a first addition operation group 122 consisting of addition operation units performing addition operation on the first and second masked random values a', b' and a previous carry input $ca_{i-1}$ respectively; and a second addition operation group 124 consisting of addition operation units performing addition operation on the first and second masked random values a', b' and a previous carry input $ca_{i-1}$, and the first and the second random values ma, mb respectively.

The first addition operation group 122 includes an addition operation unit which performs an addition operation on the first and the second masked random values a' and b', another addition operation unit which performs an addition operation on the second masked random value b' and the previous carry input $ca_{i-1}$, and still another addition operation unit which performs an addition operation on the first masked random value a' and the previous carry input $ca_{i-1}$.

The second addition operation group 124 includes an addition operation unit which performs an addition operation on the first random value ma and the second masked random value b', another addition operation unit which performs an addition operation on the first masked random value a' and the second random value mb, still another addition operation unit which performs an addition operation on the first random value ma and the second random value mb, further addition operation unit which performs an addition operation on the first random value ma and the previous carry input $ca_{i-1}$, and still further addition operation unit which performs an addition operation on the second random value mb and the previous carry input $ca_{i-1}$.

The results output from the first and second addition operation groups 122, 124 are input to the carry generator 130.

The carry generator 130 is connected to the addition operation part 120, and generates a final adaptive carry $ca_i$ by using the result of the addition operation part 120. The carry generator 130 includes: a first carry operation unit 132 for generating a first carry by performing XOR operation on the outputs of the addition operation units in the first addition operation group 122; a second carry operation units 134 for generating a second carry by performing XOR operation on the outputs of the addition operation unit in the second addition operation group 124; and a third carry operation unit 136 for generating the final adaptive carry $ca_i$ by performing XOR operation on the first carry and the second carry.

In other words, the first carry operation unit 132 outputs a result of XOR operation on: a result of addition operation on the first and the second masked random values a' and b'; a result of addition operation on the first masked random value a' and the previous carry input $ca_{i-1}$; and a result of addition operation on the second masked random value b' and the previous carry input $ca_{i-1}$.

The second carry operation unit 134 outputs a result of XOR operation on: a result of addition operation on the first and the second random values ma and mb; a result of addition operation on the first random value ma and the previous carry input $ca_{i-1}$; and a result of addition operation on the second random value mb and the previous carry input $ca_{i-1}$.

The results output from the first carry operation unit 132 and the second carry operation unit 134 are input to the third carry operation unit 136.

The third carry operation unit 136 generates the final adaptive carry $ca_i$ by performing XOR operation on the results output from the first carry operation unit 132 and the second carry operation unit 134. The final adaptive carry $ca_i$ is provided to a next addition operation unit.

The summation bit generator 140 generates a summation bit SUM by using the summation random value ms, the first and the second masked random values a' and b', the previous carry input $ca_{i-1}$, and the first and the second random values ma and mb. The summation bit generator 140 includes: a first summation operation unit 142 for generating a first result value by performing XOR operation on the summation random value ms and the first and the second random values ma and mb; a second summation operation unit 144 for generating a second result value by performing XOR operation on the first and the second masked random values a' and b' and the previous carry input $ca_{i-1}$; and a third summation operation unit 146 for generating a summation bit $sum_i$ by performing XOR operation on the first and the second result values.

An addition operation apparatus for prevention of side channel attack, capable of performing total n-bit operation, can be embodied by connecting the final adaptive carry bit cap in accordance with an embodiment of the present invention.

While the invention has been shown and described with respect to the embodiments, it will be understood by those skilled in the art that various changes and modification may be made without departing from the scope of the invention as defined in the following claims.

What is claimed is:

1. A masking addition operation apparatus for prevention of a side channel attack, the apparatus comprising:
   a random value generation unit generating a first random value for a first input, second random value for a second input, and a summation random value ms;
   an operator respectively performing an operation on the first random value, the second random value, a previous carry input, and a first and a second masked random values which are generated based on the first and the second random values respectively;
   a carry generator generating a carry input by using a result of the operation of the operation part; and
   a summation bit generator generating a summation bit by using the summation random value, the first and the second random values, the previous carry input and the first and second masked random values,
   wherein the operator includes:
   a first addition operator group for including a first plurality of addition operation units performing an addition operation on the first and second masked random values and the previous carry input respectively; and
   a second addition operator group having a second plurality of addition operation units performing an addition operation on the first and the second masked random values, the previous carry input, and the first and the second random values respectively,
   wherein the carry generator includes:
   a first carry generator generating a first carry by performing XOR operation on outputs of the first plurality of addition operation units in the first addition operation group;
   a second carry generator generating a second carry by performing XOR operation on outputs of the second plurality of addition operation units in the second addition operation group; and
   a third carry generator generating a final adaptive carry by performing XOR operation on the first carry and the second carry
   wherein the random value generation unit is a random number generator which generates the first and the second random values and the summation random value randomly.

2. The masking addition operation apparatus of claim 1, wherein the first and the second masked random values are generated by masking the first and the second random values respectively.

3. The masking addition operation apparatus of claim 1, wherein the first and the second masked random values are generated by performing a XOR operation on the first and the second inputs, and the first and the second random values respectively.

4. The masking addition operation apparatus of claim 1, wherein the summation bit generator includes:
   a first summation generator generating a first result value by performing XOR operation on the summation random value and the first and the second random values;
   a second summation generator generating a second result value by performing XOR operation on the first and the second masked random values and the previous carry input; and
   a third summation generator generating the summation bit by performing XOR operation on the first and the second result values.

* * * * *